United States Patent
Guajardo, Sr.

(10) Patent No.: US 10,717,546 B2
(45) Date of Patent: Jul. 21, 2020

(54) SOLAR-POWERED MOBILE ESCALATOR

(71) Applicant: ESME, LLC, Albuquerque, NM (US)

(72) Inventor: Daniel E. Guajardo, Sr., Albuquerque, NM (US)

(73) Assignee: ESME, LLC, Albuquerque, NM (US)

( * ) Notice: Subject to any disclaimer, the term of this patent is extended or adjusted under 35 U.S.C. 154(b) by 0 days.

(21) Appl. No.: 16/438,120

(22) Filed: Jun. 11, 2019

(65) Prior Publication Data

US 2019/0329904 A1  Oct. 31, 2019

Related U.S. Application Data

(63) Continuation of application No. 15/594,375, filed on May 12, 2017, now Pat. No. 10,315,782.

(51) Int. Cl.
| | | |
|---|---|---|
| *B64F 1/315* | (2006.01) | |
| *F41H 5/24* | (2006.01) | |
| *B66B 20/00* | (2006.01) | |
| *B66B 23/00* | (2006.01) | |

(52) U.S. Cl.
CPC ............ *B64F 1/315* (2013.01); *F41H 5/24* (2013.01); *B66B 20/00* (2013.01); *B66B 23/00* (2013.01)

(58) Field of Classification Search
CPC ......... B65G 15/00; B65G 25/10; B64F 1/315; F41H 5/24; B66B 23/00
USPC .................... 105/1.4; 198/312, 321, 319.1
See application file for complete search history.

(56) References Cited

U.S. PATENT DOCUMENTS

| | | | |
|---|---|---|---|
| 3,033,340 A | | 5/1962 | Coryell |
| 3,711,881 A | * | 1/1973 | Chapman ............... B64F 1/305 14/71.5 |
| 3,759,195 A | | 9/1973 | Hitrys et al. |
| 4,120,067 A | | 10/1978 | Hone et al. |
| 4,733,767 A | | 3/1988 | Anderson et al. |
| 5,040,257 A | | 8/1991 | Bentz |
| 5,431,463 A | | 7/1995 | Chou |
| 6,223,879 B1 | | 5/2001 | Schops |
| 6,808,057 B1 | | 10/2004 | Nirmal et al. |
| 7,268,676 B2 | | 9/2007 | Irvine |
| 7,389,826 B2 | | 6/2008 | Linsmeier et al. |

(Continued)

FOREIGN PATENT DOCUMENTS

| | | | |
|---|---|---|---|
| CN | 2878201 Y | 3/2007 | |
| CN | 20062007281 | * 3/2007 | ............... B64F 1/00 |

(Continued)

OTHER PUBLICATIONS

Aviogei SI 24-58 short sheet and Technical Data sheet; Proof of date of short sheet in Wayback Machine, 2016 (Year: 2016).*

(Continued)

*Primary Examiner* — Gene O Crawford
*Assistant Examiner* — Lester III Rushin
(74) *Attorney, Agent, or Firm* — Peacock Law P.C.; Deborah A. Peacock; Justin R. Jackson

(57) ABSTRACT

Self-contained mobile solar-powered escalator systems for aircraft entry comprising a security canopy and safety walls for protection, an electric cargo vehicle, an escalator, a lift system, exiting platform, leveler/stabilizers, heavy duty front and rear suspension, formal arriving platform, handrails, repair compartments, expandable waterproof and bulletproof canopy, distance light indicator, inflatable rubber bumper, and emergency brakes.

19 Claims, 8 Drawing Sheets

(56) References Cited

U.S. PATENT DOCUMENTS

| | | |
|---|---|---|
| 2005/0272329 A1 | 12/2005 | Tueshaus et al. |
| 2006/0097237 A1 | 5/2006 | McGregor |
| 2007/0215434 A1* | 9/2007 | Moore .................. G06Q 99/00 198/321 |
| 2011/0079166 A1* | 4/2011 | Popa-Simil ............ B60K 16/00 105/1.4 |
| 2011/0288707 A1 | 11/2011 | Westlake |
| 2012/0180642 A1 | 7/2012 | Pavon |
| 2016/0226060 A1 | 8/2016 | Uchida |

FOREIGN PATENT DOCUMENTS

| | | |
|---|---|---|
| CN | 201002911 Y | 1/2008 |
| CN | 101767656 A | 7/2010 |
| CN | 102442436 A | 5/2012 |
| CN | 202244102 U | 5/2012 |
| EP | 0372386 | 6/1990 |
| EP | 0421191 | 4/1991 |
| JP | 9194198 A | 7/1997 |
| JP | 2005349993 A | 12/2005 |
| KR | 2010009377 U | 9/2010 |
| WO | 9961317 | 12/1999 |

OTHER PUBLICATIONS

"Stic Result List NPL Search for armor, amour, escalator, bullet", 2018.
"Universal Passenger Stairs SI24-58", Aviogei SI 24-58 short sheet and Technical Data Sheet; Proof of Date of short sheet in Wayback Machine, 2016 (Year:2016).

\* cited by examiner

SOLAR-POWERED MOBILE ESCALATOR

CROSS-REFERENCE TO RELATED APPLICATIONS

This application is a continuation application of U.S. patent application Ser. No. 15/594,375, entitled "Protection and Security Mobile Solar-Powered Escalator", to Daniel E. Guajardo Sr., filed on May 12, 2017, and the specification and claims thereof are incorporated herein by reference.

BACKGROUND OF THE INVENTION

Field of the Invention (Technical Field)

Embodiments of the present invention relate to mobile escalators, and more particularly to a solar-powered escalator with safety walls and dome security cover over the escalator for the security, safety, and comfort of the user.

Description of Related Art

When boarding an aircraft from the ground level, open-air stairways leading up to the aircraft door are traditionally used to board passengers. These traditionally truck-mounted mobile stairways (see FIG. 1) can be dangerous and inconvenient for individuals boarding an aircraft. For example, truck-mounted mobile stairways can cause accidents such as tripping or falling and can be dangerous especially in inclement weather. Risks can generally arise from the steep grade of the steps, and the materials and mechanics used to construct the stairway, including inadequate railing, flooring, stability, and so forth. Moreover, known truck-mounted stairways leave passengers boarding an aircraft open to risk and exposed to attacks, for example from snipers shooting from long distances or chemicals or chemical agents.

In particular, the use of such open-air stairways leading up to the aircraft door is particularly dangerous when passengers boarding the aircraft are high-profile individuals or dignitaries, such as the United States President, United States Secretary of State, other heads of state, celebrities, or other individuals that might otherwise be the target of an attack to their person. The safety and security of these individuals is at risk because traditional truck-mounted mobile stairways provide inadequate protection when boarding an aircraft. Additionally, in the case of fossil fuel powered trucks and motors, truck-mounted stairways and escalators have a massive carbon footprint and are generally unfriendly to the environment.

Embodiments of the present invention solve these problems of risk to personal security and environmental concerns. Embodiments of the present invention provide a protection and security self-contained mobile solar-powered escalator system containing an electric cargo vehicle with its own repair and maintenance compartment, an escalator with bulletproof base and security canopy and safety walls accentuating the security and safety of persons boarding an aircraft from the ground level. Embodiments of the present invention provide 360-degree security, external solar panels and interior lighting, hydraulic raise/lower pistons, an exiting platform, and a formal arrival platform. Embodiments of the present invention further proved a driver all-weather compartment with a clear top, leveler and stabilizers, heavy duty front and rear suspension, handrails, repair compartments, optional expandable waterproof and bulletproof entry and exit point coverings, optional interior air conditioning and heating, optional interior and exterior security cameras, a distance light indicator, an inflatable rubber bumper, emergency brakes, optional installments for the physically impaired, e.g., a commercially available stair lift or a wheelchair accommodative escalator combinations thereof, and the like.

BRIEF SUMMARY OF THE INVENTION

Embodiments of the present invention comprise self-contained vehicle mounted systems. In one embodiment, a vehicle mounted system comprises a cargo vehicle comprising a powerdrive, one or more batteries, braking, suspension, steering, and electrical systems, front, rear, sides and bottom ends, the front end comprising an enclosed driver compartment and the rear end comprising a bed, the top of the bed comprising a lift system disposed thereon, an escalator pivotally connected to a rear end of the bed, the escalator comprising a front and a rear end, an escalator track comprising steps, a security canopy comprising a top and safety walls rated at least level one for stopping bullets, the front end of the escalator comprising a first platform and the rear end of the escalator comprising a second platform, and one or more maintenance/storage compartments.

In one embodiment, the escalator comprises solar photovoltaic cells, for example, disposed on the safety canopy. In one embodiment, the first platform comprises an inflatable rubber bumper. In one embodiment, the system comprises an expandable waterproof accordion-like canopy above the first platform, optionally made of a bulletproof material rated at least level one for stopping bullets. In one embodiment, the canopy extends above a full length of the escalator. In one embodiment, the safety walls extend a full length of the escalator, are transparent, and/or are bulletproof. In one embodiment, the canopy is bulletproof. Preferably, the escalator comprises hand rails and an expandable accordion-like canopy above the exiting platform that is preferably waterproof.

In one embodiment, the escalator comprises interior lighting and/or a distance or proximity indicator. Optionally, the exiting platform can include a bumper—most preferably an inflatable bumper made from an elastic material such as rubber.

In one embodiment, the lifting system comprises hydraulic pistons. In one embodiment, the enclosed driver compartment comprises a transparent top. Preferably, the vehicle mounted system comprises one or more stabilizers. In one embodiment, the rear end of the escalator comprises a second platform, with optional non-moving steps. In one embodiment, the system comprises a waterproof and bulletproof entry/exit point covering disposed over the second platform and its non-moving steps rated at least level one for stopping bullets.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
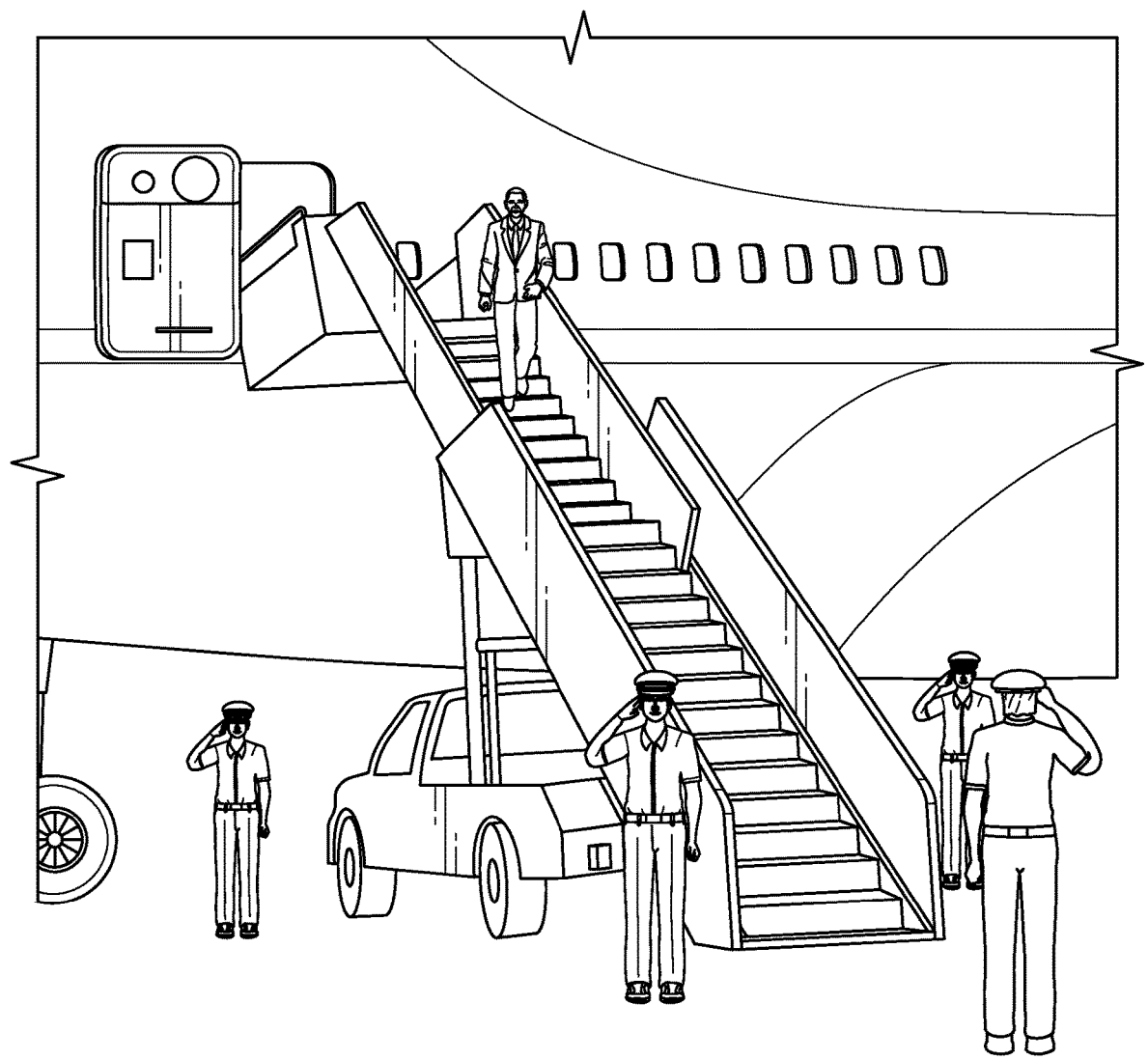
FIG. 1 illustrates the prior art by showing an exposed dignitary going down a truck mounted stairway.
Figure 2:
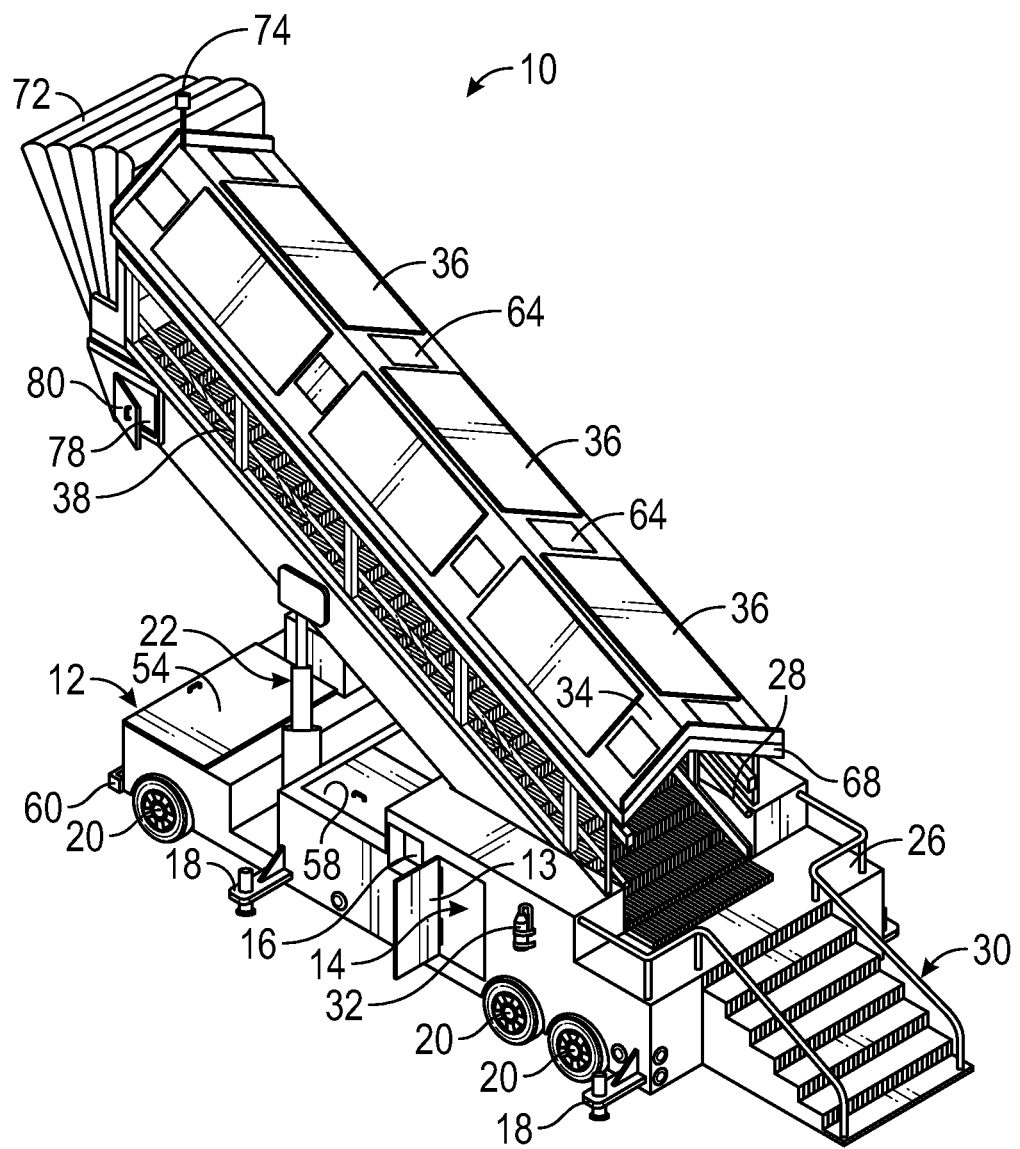
FIG. 2 is a perspective view of an embodiment of the present invention with the escalator in a lifted configuration.
Figure 3:
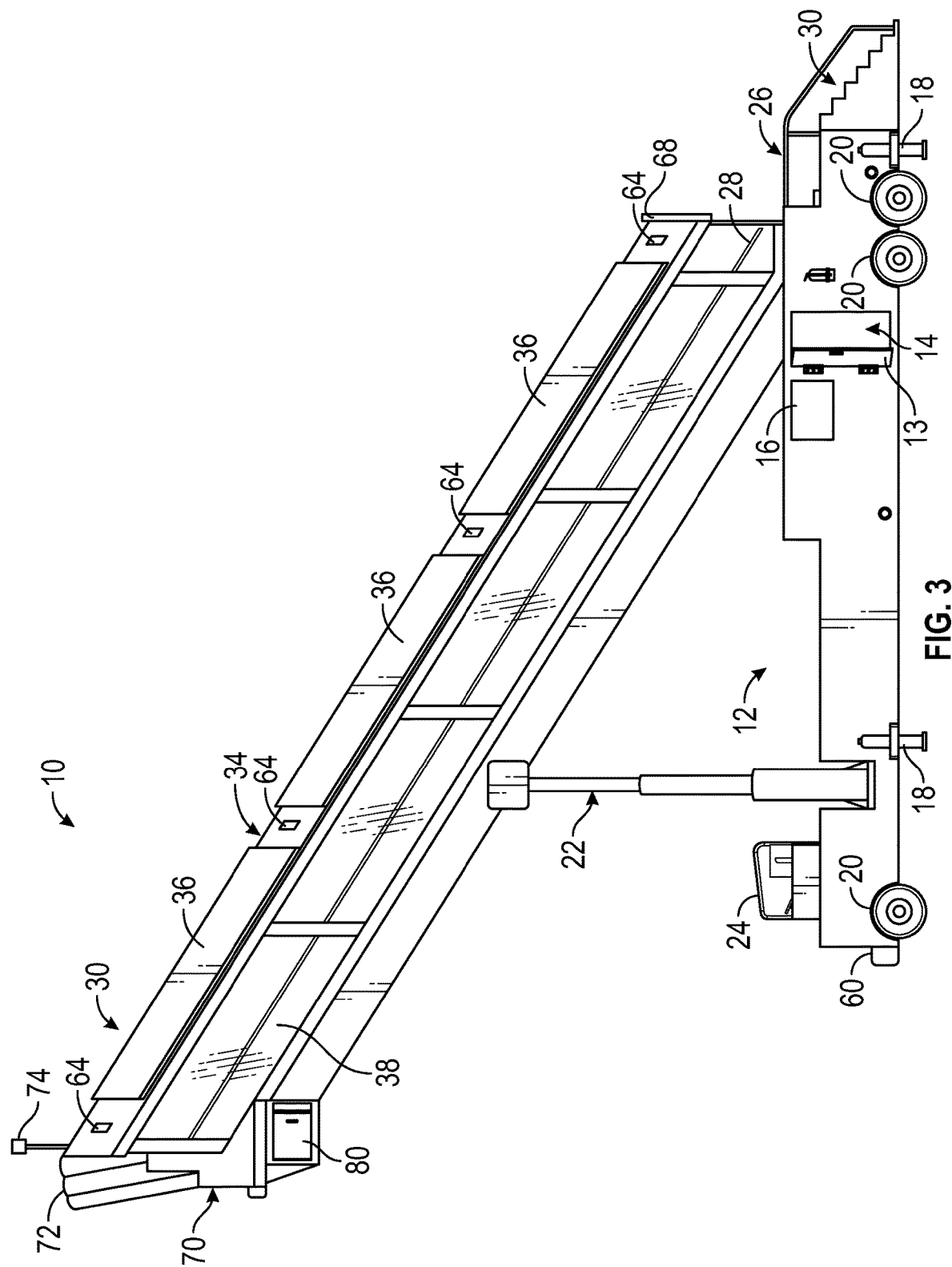
FIG. 3 is a left side view of the embodiment of FIG. 2.
Figure 4:
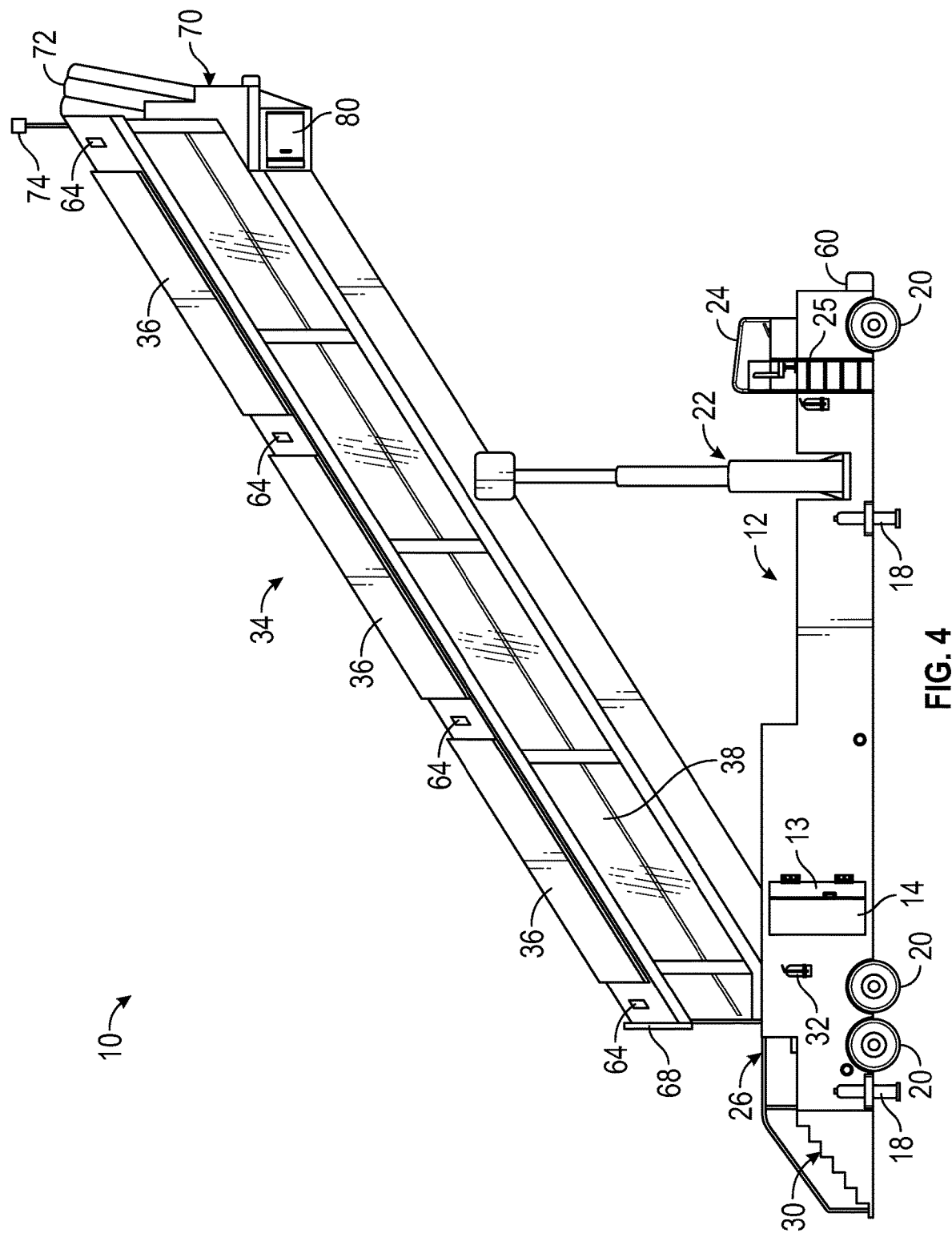
FIG. 4 is a right side view of the embodiment of FIG. 2.

Embodiments of the present invention relate to protection and security self-contained mobile solar-powered escalators.

In one embodiment, the mobile solar-powered escalator comprises an electric cargo vehicle with its own repair and maintenance compartment, an escalator with bulletproof base, a security canopy enhancing the security and safety of persons boarding an aircraft from the ground-level by providing 360-degree security, bulletproof safety walls where the security canopy has external solar panels and interior lighting, hydraulic raise/lower pistons, an exiting platform, a formal arrival platform, a leveler and stabilizers, heavy duty front and rear suspension, handrails, repair compartments, optional expandable waterproof and bulletproof entry and exit point coverings, a distance light indicator, an inflatable rubber bumper, emergency brakes, combinations thereof, and the like. In another embodiment, the security cover further comprises optional interior air conditioning and heating, interior security cameras, and exterior security cameras. In yet another embodiment, the escalator further comprises optional installments for the physically impaired, e.g., a commercially available stair lift or a wheelchair accommodative escalator. In a further embodiment, the escalator can comprise a driver all-weather compartment—optionally with a clear top.

As used throughout the specification and claims, the term "safety walls" refers to walls built of materials that are resistant to potential attacks and/or hazards including bullets, chemicals and chemical agents, fire, etc. Security canopy 34 can also be formed from such materials. More particularly, the terms "bullet resistance", "bulletproof", and/or "ballistic material", refer to various levels of security systems, including but not limited to glass, ceramics, polycarbonates, para-aramids, polyethylene and other plastics, titanium, steel, carbon fiber composite materials, other ballistic materials whether opaque, translucent, or transparent, combinations thereof, that have been established by Underwriters Laboratory ("UL") through experimental testing and found effective at stopping certain types of projectiles, e.g., bullets of calibers most typically employed during armed robberies, assassination attempts, etc., and rated at levels one through eight and supplementary for shotgun shown in table 1 below or their equivalents:

TABLE 1

| Rating | Ammunition | Weight | (g) | V min FPS | V mas FPS | V MPS | No. of Shots |
|---|---|---|---|---|---|---|---|
| Level 1 | 9 mm Full Metal Copper Jacket with Lead Core | 124 grains | 8.00 | 1175 | 1293 | 358 | 3 |
| Level 2 | .357 Magnum Jacketed Lead Soft Point | 158 grains | 10.20 | 1250 | 1375 | 385 | 3 |
| Level 3 | .44 Magnum Lead Semi-Wadcutter Gas Checked | 240 grains | 15.60 | 1350 | 1485 | 411 | 3 |
| Level 4 | .30 Caliber Rifle Lead Core Soft Point (.30-06 Caliber) | 180 grains | 11.7 | 2540 | 2794 | 774 | 1 |
| Level 5 | 7.62 mm Rifle Lead Core Full Metal Copper Jacket, Military Ball (.308 Caliber) | 150 grains | 9.7 | 2750 | 3025 | 838 | 1 |
| Level 6 | 9 mm Full Metal Copper Jacket with Lead Core | 124 grains | 8.0 | 1400 | 1540 | 427 | 5 |
| Level 7 | 5.56 mm Rifle Full Metal Copper Jacket with Lead Core (.223 Caliber) | 55 grains | 3.56 | 3080 | 3388 | 939 | 5 |
| Level 8 | 7.62 Rifle Lead Core Full Metal Copper Jacket, Military Ball (.308 Caliber) | 150 grains | 9.7 | 2750 | 3025 | 838 | 5 |
| Supplementary Shotgun | 12-Gauge Rifled Lead Slug | 1 oz. | 28.30 | 1585 | 1744 | 483 | 3 |
| Supplementary Shotgun | 12-Guage 00 Lead Buckshot (12 pellets) | 1.5 oz. | 42.00 | 1200 | 1320 | 366 | 3 |

Referring to the accompanying drawings, and particularly to FIGS. 2-6, according to one embodiment of the present invention, self-contained mobile solar-powered escalator 10 comprises cargo vehicle 12, which is preferably electric and front wheel drive. Cargo vehicle 12 preferably comprises repair/maintenance compartment 14, accessible through one or more doors 13. Preferably, compartment 14 houses a motor for an escalator and a pivot mechanism that allows the escalator to move up and down, spare tires, tools, etc. Cargo vehicle 12 can further comprise control external panel 16, tires 20, which can optionally be aircraft quality and in tandem, hydraulic piston leveler and stabilizers 18, which can optionally raise for maintenance, e.g., tire maintenance without the need of a floor jack. Preferably, cargo vehicle 12 comprises a steering system with tie rods or robotic units for front tires 20 for independently steering, and hydraulic pistons 22, which, in one embodiment preferably have a 20-ton capacity each to raise and lower the escalator to desired levels depending on the height of the aircraft. In one embodiment, control external panel 16 comprises at least one power outlet to optionally provide power for external needs, such as electric vehicles in the vicinity of self-contained mobile solar-powered escalator 10. In this manner, self-contained mobile solar-powered escalator 10 is optionally used as a generator when it is not needed for boarding/exiting of aircraft passengers. Particularly, when additional photovoltaic solar panels are disposed on other surfaces of self-contained mobile solar-powered escalator 10, such as openable hood 54 and openable lids 58.

Preferably, cargo vehicle 12 further comprises driver cabin 24, the top of which can optionally be made of a clear material such as transparent or translucent material, for example glass or plastic. Such clear material can improve the visibility of an operator. Optionally, driver cabin 24 is weather-proofed and can be accessible through stairs 25. In one embodiment, cargo vehicle 12 also comprises formal arriving platform 26, handrails 28, and optionally escalating steps 30. In one embodiment, formal arriving platform 26 and escalating steps 30 are preferably made of non-slipping expanded metal. Optionally, fire extinguishers 32 are removably attached to cargo vehicle 12, and are preferably electric fire extinguishers. In one embodiment, cargo vehicle 12 comprises front wheel drive, electric motor and ignition, front and rear running lights, side lights, and back up lights. Optionally, cargo vehicle 12 comprises power steering and electric brakes.

Figure 7:
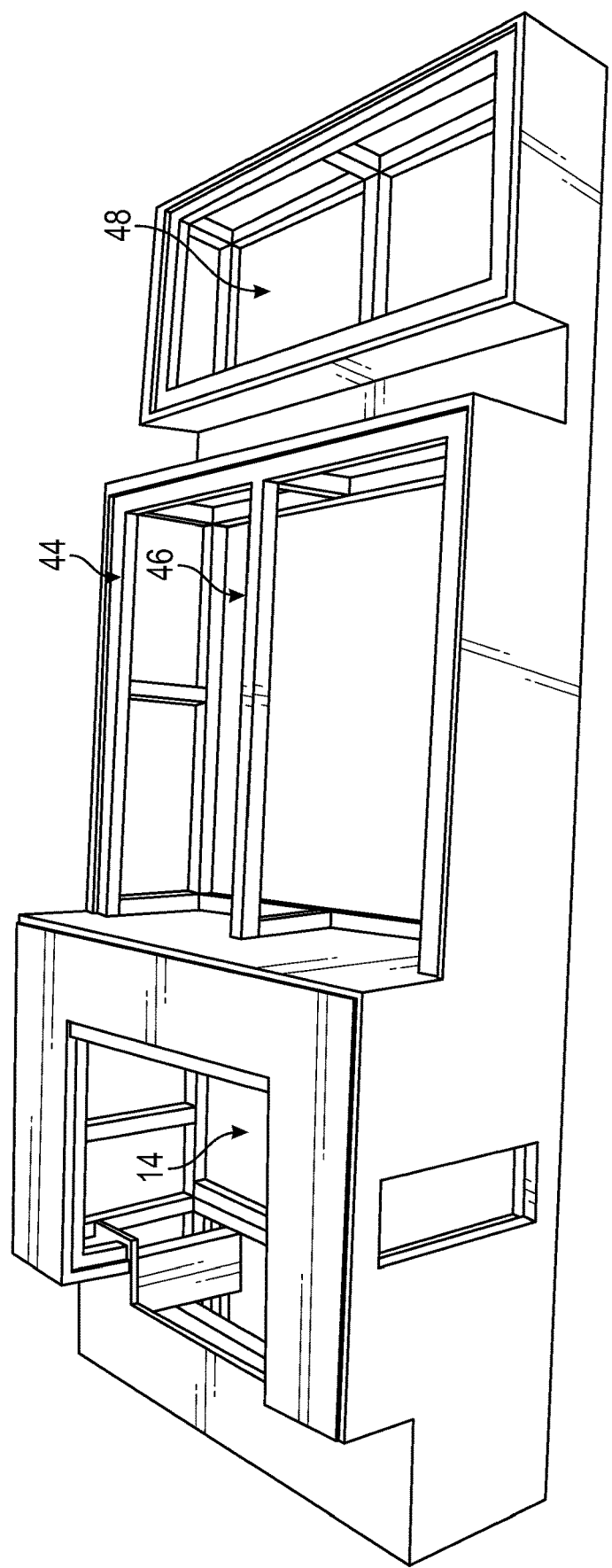
FIG. 7 is a perspective view of the frame preferably used in the manufacture of the embodiment of FIG. 2, with metal sheets partially covering the frame.

In one embodiment, a low cost/low maintenance electric cargo vehicle is manufactured by first building frame 44 (see FIG. 7). Frame 44 can be built from suitable materials such as steel. Optionally, frame 44 can be double reinforced. Frame 44 is preferably built to accommodate repair/maintenance compartment 14, batteries storage compartment 46, and engine compartment 48. Optionally, workbench (not shown) is disposed in repair/maintenance compartment 14. Preferably, sheets of, for example, metal or other suitable materials, are used to cover frame 44 during manufacturing of cargo vehicle 12, as illustrated in FIG. 7.

Engine compartment 48 preferably houses electric motor (not shown) and comprises openable hood 54. Batteries compartment 46 preferably comprises one or more batteries (not shown), and further comprises one or more openable lids 58. Optionally, cargo vehicle 12 comprises bumper 60, which can optionally comprise front emergency towing rig 62. Alternatively, other towing devices can be attached to bumper 60, including hitches, hooks, combinations thereof, and the like.

In one embodiment, mobile solar-powered escalator 10 preferably comprises bulletproof security canopy 34 and safety walls 38 rated at least level one for stopping bullets, more preferably rated at least level five, and most preferably rated at least level eight. Security canopy 34 and safety walls 38 enhance the security and safety of persons boarding an aircraft from the ground-level by providing 360-degree security via bulletproof safety walls 38 being either fused together as separate panels or manufactured in one smooth piece depending on the ballistic materials used, and the weight of such ballistic materials. Such ballistic materials used include bullet-resistant glass, ceramics, polyethylene and other plastics, titanium, steel, Kevlar, Lexan, carbon fiber composite materials, other ballistic materials whether opaque or transparent, combinations thereof and the like and are preferably rated at least level one, more preferably at least level five, and most preferably rated at least level eight for stopping bullets by UL. Depending on the ballistic materials used, security canopy 34 can be removable. The optimal material of security cover 34 is preferably carefully selected to stop all types of bullets or weapons anticipated for the specific use. In one embodiment of the present invention, safety walls 38 are of substantial thickness, e.g., about six inches thick, and depending on the ballistic material used, thicker as necessary for the safety of the user.

In the case of chemicals and chemical agents, the shaft of mobile solar-powered escalator 10 can be retrofitted with air filtration systems and the like to inhibit chemicals and chemical agents from entering either the aircraft or permeating the air interior to mobile solar-powered escalator 10—for example by blowing air down from the aircraft entry door. Additionally, mobile solar-powered escalator 10 can be equipped with emergency oxygen supply equipment. Furthermore, the escalator base of mobile solar-powered escalator 10 can preferably be constructed from, or reinforced with, ballistic materials rated to withstand all types of known bullets or weapons anticipated for the specific use and those that will be discovered in the future, e.g. levels 1-8 under UL categories or equivalent. Such materials could also include bullet-resistant glass, ceramics, polyethylene and other plastics, titanium, steel, Kevlar, Lexan, carbon fiber composite materials, other ballistic materials whether opaque or transparent, combinations thereof and the like.

Optionally, security canopy 34 can be colored with either paint, lacquers, or additives to glass or plastic to fit the preference of the user or to camouflage into the environment of use. Where photovoltaic systems are used (see description below), the photovoltaic is preferably overlaid over safety canopy 34 and safety walls 38, and can further be manufactured to blend with the overall color and design preferences of the user. Paints and lacquers used can further enhance the safety, security and comfort of mobile solar-powered escalator 10 with careful selection of paints and lacquers used, e.g., solar reflective or insulative paint, radiation reflective paint, or other specialized paints providing necessary levels of protection.

Preferably, security canopy 34 comprises a pitched configuration and can optionally comprise gutter-like cap 68 at the arrival end of security canopy 34, to deflect, for example, rain or snow away from formal arrival platform 26. Mobile solar-powered escalator 10 preferably comprises exiting platform 70.

Figure 8:
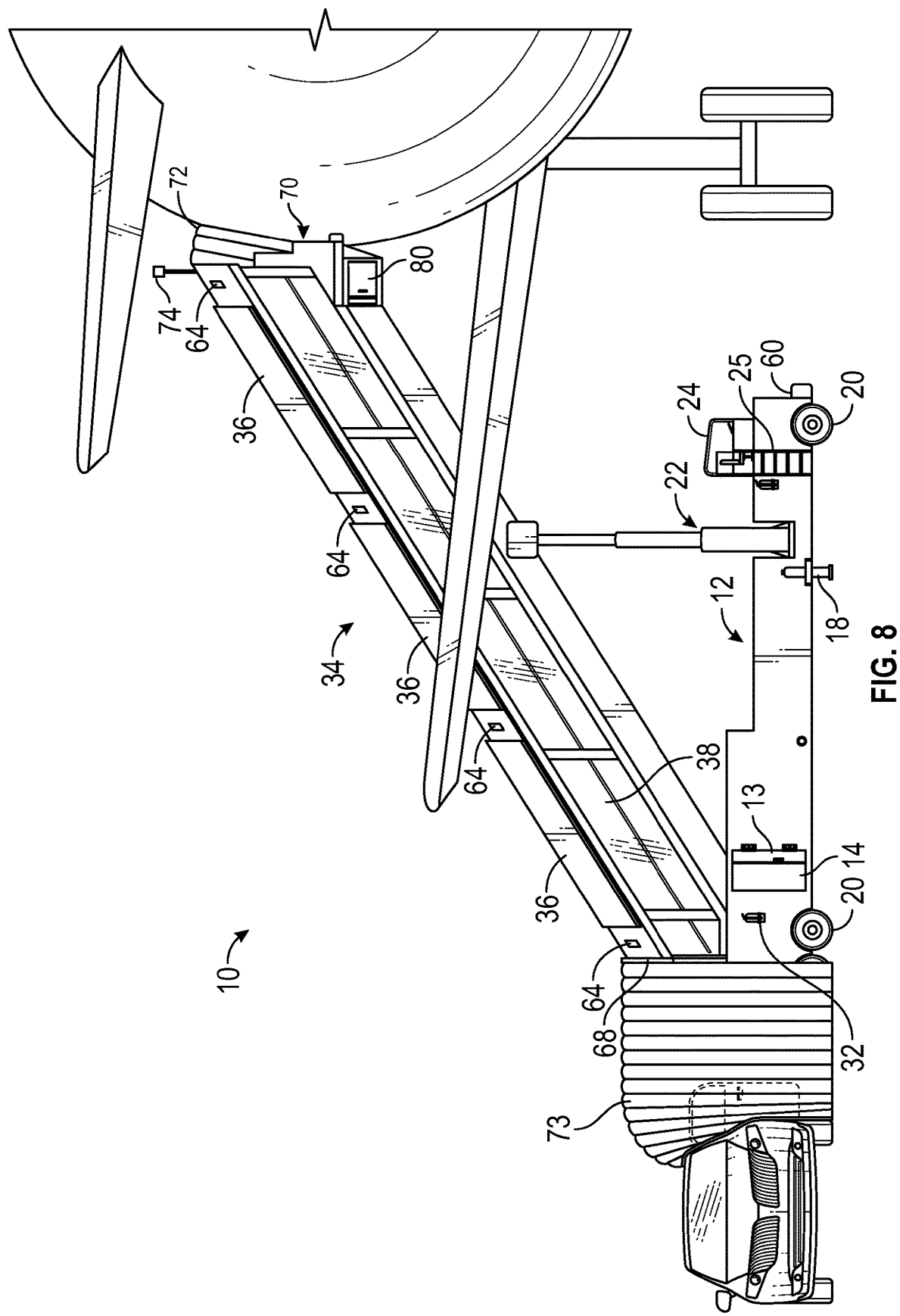
FIG. 8 is a side view of an embodiment of the invention further comprising an exiting/entry point covering extending all the way to a transportation vehicle.

Referring to FIG. 8, in one embodiment, security canopy 34 comprises optional expandable waterproof and bulletproof entry and exit point coverings 72 and 73, e.g., an accordion-like or smooth expandable waterproof and bulletproof (rated at least level one) entry and exit point coverings 72 and 73 above platforms 70 and 26 that overlays onto the aircraft entry door and the vehicle door from which a user exits in order to board the aircraft. In one embodiment, waterproof and bulletproof entry and exit point coverings 72 and 73 can preferably expand to wrap around the aircraft's door and a vehicle door, and can retract when not in use. Waterproof and bulletproof entry and exit point coverings 72 and 73 can be optionally operable from either aircraft platform 70 or driver cabin 24. In one embodiment, waterproof and bulletproof entry and exit point coverings 72 and 73 are constructed from flexible materials such as, but not limited to, rubber reinforced with ballistic nylon, Kevlar and Aramid fibers, reinforced carbon fiber composite materials, or any other flexible ballistic materials.

Security canopy 34 preferably comprises photovoltaics in the form solar panels 36, which can be raised above the roof of security canopy 34. Security canopy 34 preferably comprises thin, flexible photovoltaic solar panels 36 that can be molded to the shape of security canopy 34, can be transparent or opaque, and decrease the weight of security canopy 34. Alternatively, a plurality of smaller garden style solar panels 64 in addition to solar panels 36 can be used. In one embodiment, smaller solar panels 64 can optionally be placed between solar panels 36. Solar panels 36 and smaller solar panels 64 can optionally power interior lighting 66 on the ceiling, optional air conditioning and heating built into security canopy 34, optional security cameras (not shown) both interior and external to security canopy 34, an accumulator, which is preferably stored in compartment 14, and can be connected to and capable of charging one or more batteries 56. In one embodiment, additional photovoltaic solar panels are disposed on other surfaces of self-contained mobile solar-powered escalator 10, such as openable hood 54 and openable lids 58.

Figure 5:
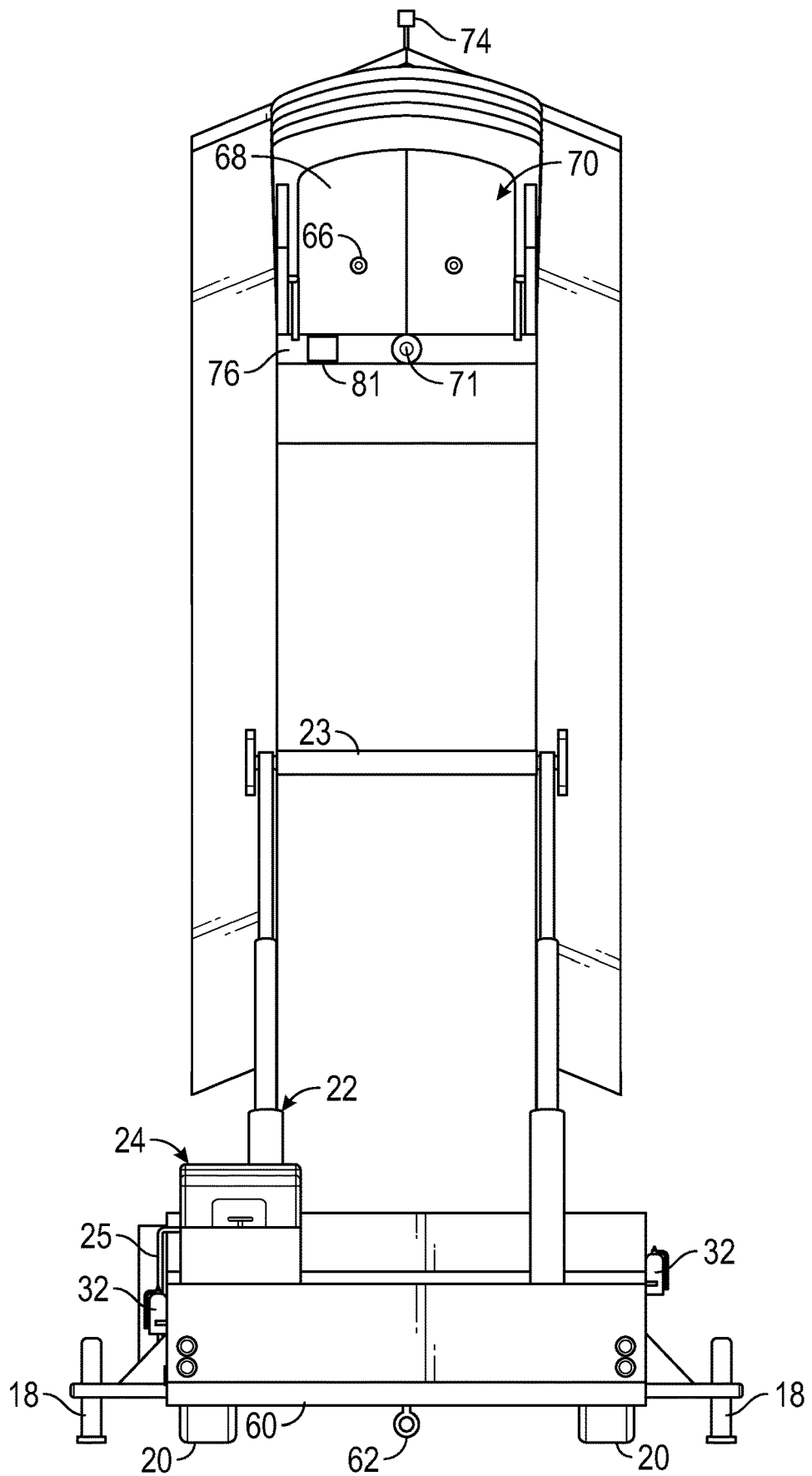
FIG. 5 is a front view of the embodiment of FIG. 2.
Figure 6:
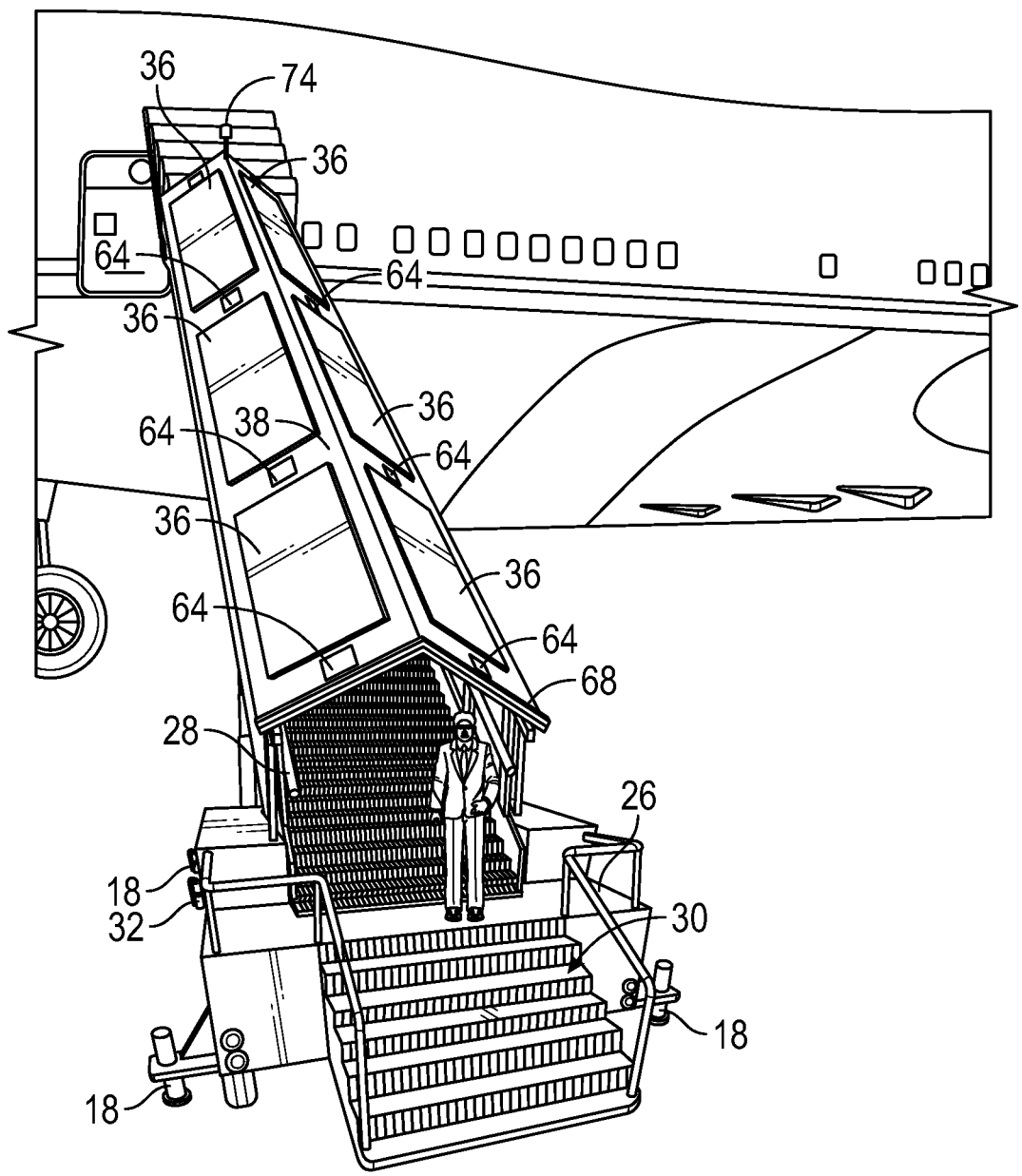
FIG. 6 is a perspective top view of the embodiment of FIG. 2 showing an optional arriving platform of the embodiment with an arriving dignitary standing on it.

Referring to FIG. 5, security canopy 34 can optionally comprise light 74, which can be red and which is preferably disposed at its highest point. In one embodiment, distance light indicator 71, which is a proximity sensor, is located above exiting platform 70, which is optionally operable from driver cabin 24. Exiting platform 70 preferably comprises one or more inflatable rubber bumpers 76 to contact, for example, an aircraft, and further comprises emergency brake sensor 81, which halts the cargo vehicle when bumper 76 contacts something. Optionally, bar 23 extends between the pistons under mobile solar-powered escalator 10 for support.

In one embodiment, mobile solar-powered escalator 10 comprises top compartment 78, which can optionally be accessible through at least one door 80 on either one or both sides of mobile solar-powered escalator 10, for any repairs required for the escalator track. In one embodiment, the top and bottom edges of bulletproof safety walls 38 preferably comprise elastic caps, which are most preferably made from rubber, for safety. In a different embodiment, a commercially available stair lift with folding arm/foot rest can optionally be installed to assist passengers with physical disabilities. Alternatively, a wheelchair-friendly or otherwise accommodating retrofitted escalator can be installed to assist passengers with physical disabilities. Although the foregoing embodiments describe numerous features which can optionally be provided, in one embodiment, only one or a few of these features can be provided.

In one embodiment, mobile solar-powered escalator 10 further comprises a fossil fuel generator to produce additional and/or backup power for the system. In a different embodiment, the cargo vehicle has a fossil fuel powered engine.

One embodiment of the invention comprises a method of safely disembarking passengers (e.g., dignitaries traveling by aircraft) comprising: driving a self-contained vehicle mounted system like the one disclosed above to a proximity of a disembarking door in its lowered configuration; lifting the escalator of the system; driving the self-contained vehicle mounted system toward the disembarking doors until the system's distance light indicator indicates there is contact with the area below the disembarking door and the system's first platform; opening the disembarking door; deploying the system's expandable accordion-like canopy; turning on the escalator track; and turning off the escalator track after passengers have exited the system. In one embodiment, the method further comprises driving the system away from the disembarking door and lowering the escalator.

Note that in the specification and claims, "about" or "approximately" means within twenty percent (20%) of the numerical amount cited. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A self-contained vehicle mounted system comprising:
a solar-powered electric cargo vehicle;
said solar-powered electric cargo vehicle comprising a powerdrive, one or more batteries, braking, suspension, steering, and electrical systems, front, rear, sides and bottom ends;
said front end comprising an enclosed driver compartment;
said rear end comprising a bed;
a top of said bed comprising a lift system disposed on said bed;
an electric escalator pivotally connected to a rear end of said bed;
said electric escalator comprising a front and a rear end, an escalator track comprising steps, a canopy comprising a top and walls;
said front end of said electric escalator comprising a first platform comprising an expandable, waterproof accordion-like canopy;
said escalator rear end comprising a second platform;
one or more maintenance/storage compartments; and
a solar energy system disposed above said top of said canopy.

2. The self-contained vehicle mounted system of claim 1 wherein said first platform comprises an inflatable bumper.

3. The self-contained vehicle mounted system of claim 1 wherein said canopy extends above a full length of said electric escalator.

4. The self-contained vehicle mounted system of claim 1 wherein said walls extend a full length of said electric escalator.

5. The self-contained vehicle mounted system of claim 1 wherein said walls are transparent or translucent.

6. The self-contained vehicle mounted system of claim 1 further comprising hand rails.

7. The self-contained vehicle mounted system of claim 1 wherein said electric escalator comprises interior lighting.

8. The self-contained vehicle mounted system of claim 1 further comprising a distance light indicator.

9. The self-contained vehicle mounted system of claim 1 wherein said lift system comprises hydraulic pistons.

10. The self-contained vehicle mounted system of claim 1 wherein said enclosed driver compartment comprises a transparent top.

11. The self-contained vehicle mounted system of claim 1 further comprising one or more stabilizers.

12. The self-contained vehicle mounted system of claim 1 wherein said second platform comprises escalating, fixed steps.

13. The self-contained vehicle mounted system of claim 12 further comprising a waterproof entry point covering disposed over said second platform and said fixed steps.

14. A self-contained vehicle mounted system comprising:
a solar-powered electric cargo vehicle;
said solar-powered electric cargo vehicle comprising a powerdrive, one or more batteries, braking, suspension, steering, and electrical systems, front, rear, sides and bottom ends;
said front end comprising a driver compartment;
a lift system disposed on said solar-powered electric cargo vehicle;
an electric escalator pivotally connected to said solar-powered electric cargo vehicle;
said electric escalator comprising a front and a rear end, an escalator track comprising steps, a canopy comprising a top and walls;
said front end of said electric escalator comprising a first platform comprising an expandable, waterproof accordion-like canopy; and
a solar energy system configured to be raised above said top of said canopy.

15. The self-contained vehicle mounted system of claim 14 wherein said walls are transparent or translucent.

16. The self-contained vehicle mounted system of claim 14 further comprising hand rails.

17. The self-contained vehicle mounted system of claim 14 wherein said lift system comprises hydraulic pistons.

18. The self-contained vehicle mounted system of claim 14 wherein said driver compartment comprises a transparent top.

19. The self-contained vehicle mounted system of claim 14 further comprising one or more stabilizers.

* * * * *